June 7, 1955 S. A. GEORGE 2,710,316
TROLLEY FROG
Filed March 5, 1951 3 Sheets-Sheet 1
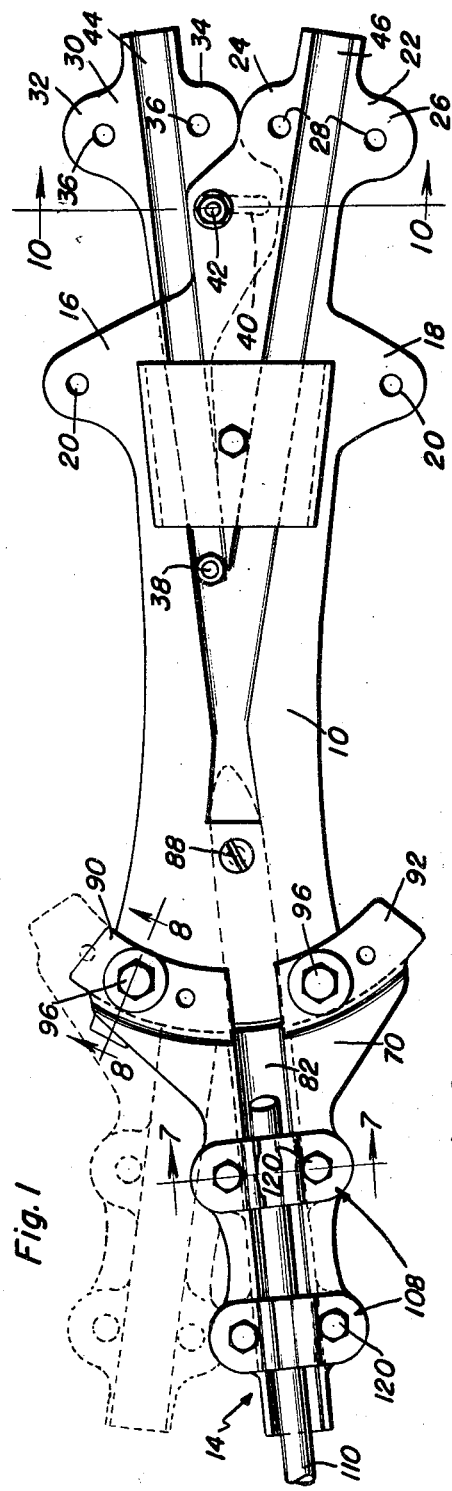
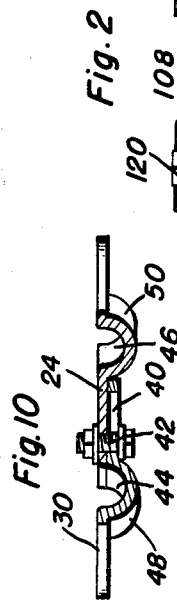
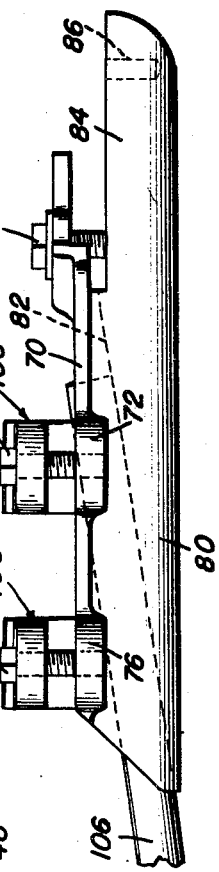
Stephen A. George
INVENTOR.

June 7, 1955 S. A. GEORGE 2,710,316
TROLLEY FROG
Filed March 5, 1951 3 Sheets-Sheet 2
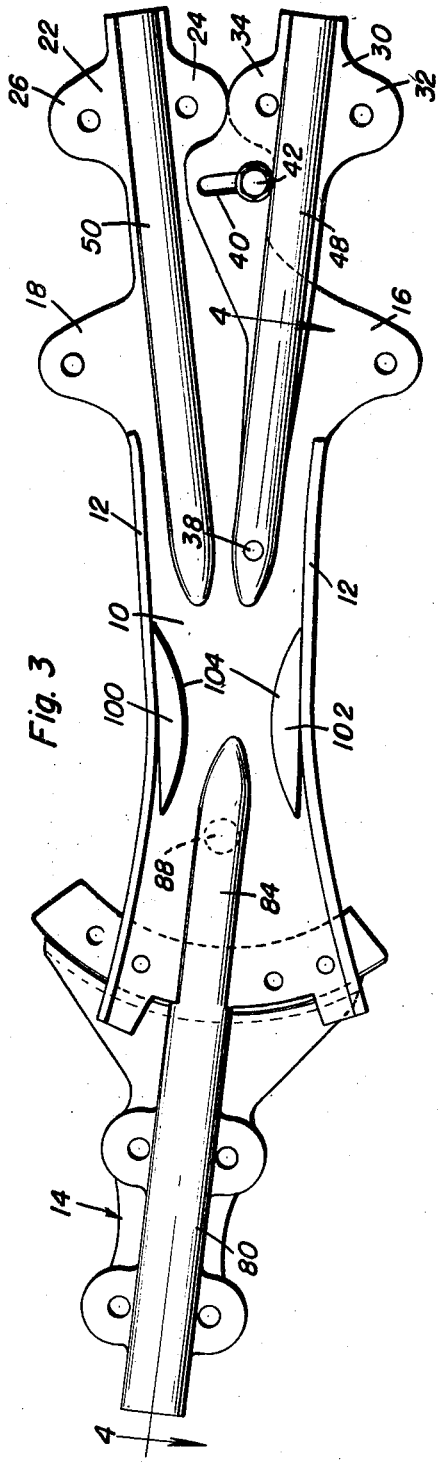
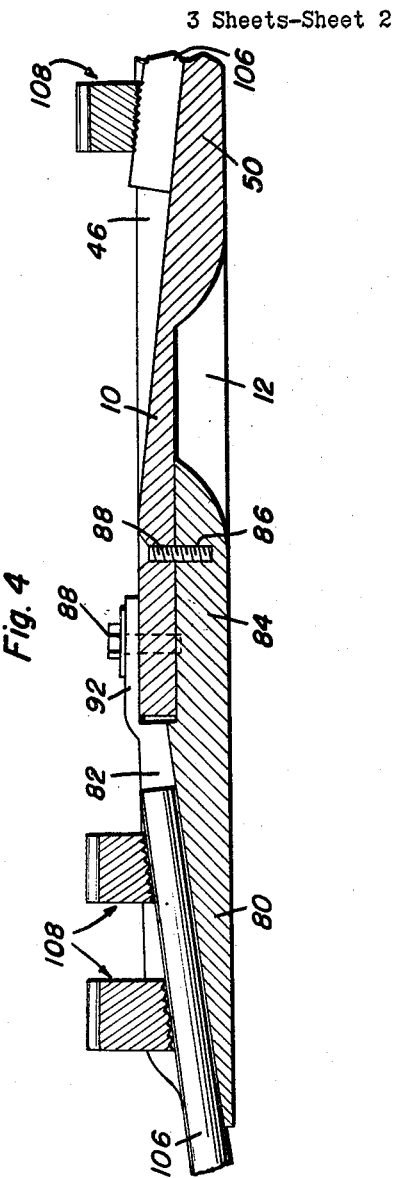
Stephen A. George
INVENTOR.
BY *Clarence A. O'Brien*
*and Harvey B. Jacobson*
Attorneys

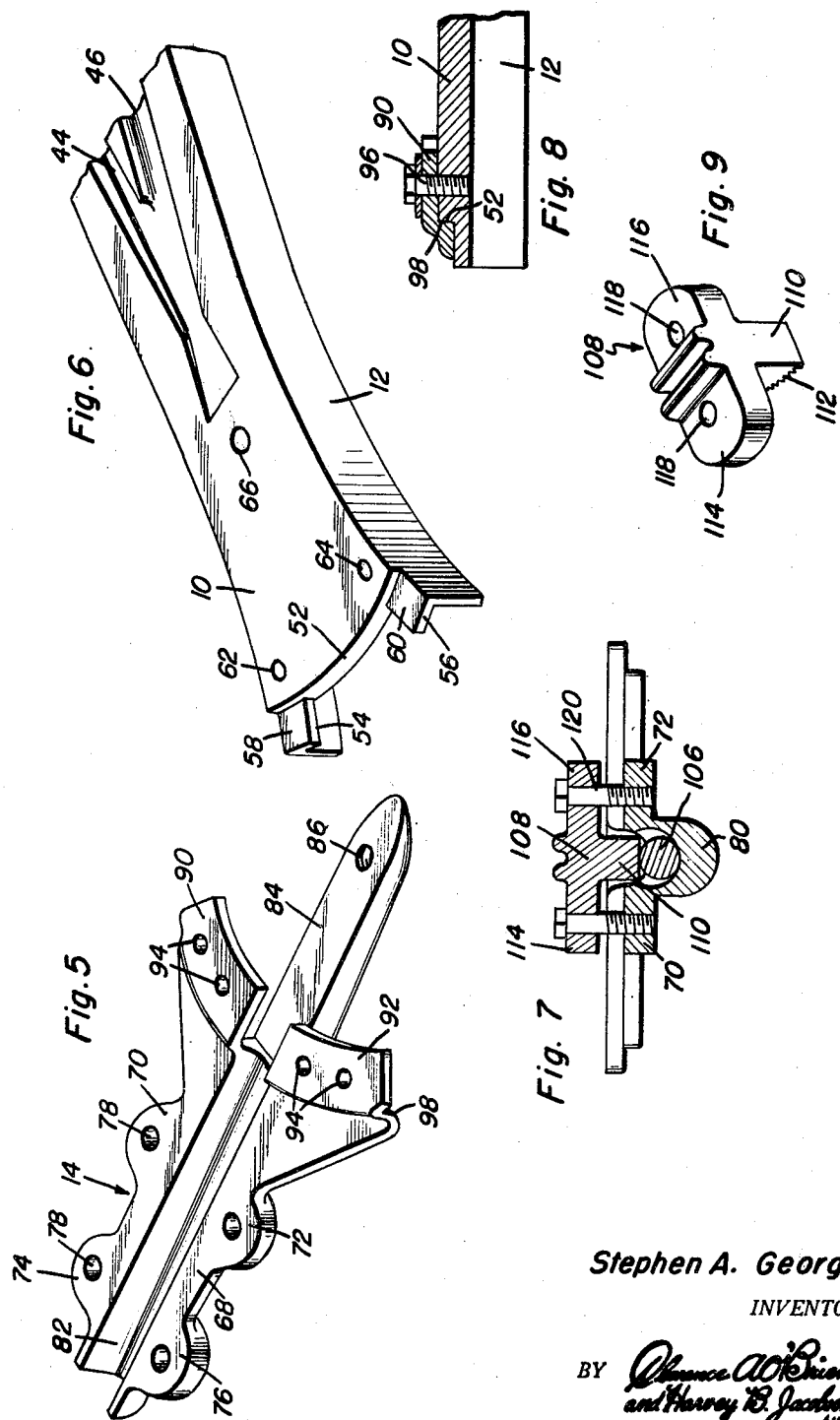

United States Patent Office 2,710,316
Patented June 7, 1955

2,710,316

TROLLEY FROG

Stephen A. George, Johnstown, Pa., assignor to Stephen A. George Company, Johnstown, Pa., a corporation of Pennsylvania Application March 5, 1951, Serial No. 213,818

1 Claim. (Cl. 191—38)

This invention comprises novel and useful improvements in a trolley frog, and more particularly of the type set forth in my prior Patent No. 1,803,061 of April 28, 1931, and more specifically pertains to an improved construction of trolley frog.

The primary object of this invention is to provide a trolley frog adapted to electrically connect a single overhead trolley wire to a pair of angular disposed trolley wires.

A further object of the invention is to provide a trolley frog in accordance with the foregoing objects in which the single trolley wire may be selectively aligned with either of the pair of inclined trolley wires.

Yet another object of the invention is to provide a trolley frog as set forth in the foregoing objects in which the pair of trolley wires may be angularly adjusted with respect to each other.

A still further object of the invention is to provide a trolley frog as set forth in the above mentioned objects in which there is provided improved means for attaching the trolley wires to the frog; and improved arrangement is provided for angularly adjusting a pair of trolley wires with respect to each other and the single trolley wire with respect to the pair of wires.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view of the improved trolley frog forming the subject of this invention, and alternative position of the single trolley wire adjusting means being indicated in dotted lines therein;

Figure 2 is a side elevational view of an adjustable plate forming a part of the trolley frog, Figure 2 being substantially a side elevational view of Figure 5, but illustrating the manner in which a trolley wire is clamped thereto;

Figure 3 is a bottom plan view of the frog illustrated in Figure 1;

Figure 4 is a longitudinal sectional view taken substantially on the vertical plane indicated by the section line 4—4 of Figure 3, and illustrating the manner in which the adjustable plate is pivotally attached to the body of the frog;

Figure 5 is a perspective view of the adjustable plate forming a part of the frog;

Figure 6 is a fragmentary perspective view of the body of the frog with which the plate of Figure 5 is associated;

Figure 7 is a vertical transverse sectional detail view taken substantially on the plane indicated by the section line 7—7 of Figure 1;

Figure 8 is a vertical sectional detail view taken substantially on the plane indicated by the section line 8—8 of Figure 1;

Figure 9 is a perspective view of one of the clamping members forming a part of the invention; and Figure 10 is a vertical transverse sectional view taken substantially on the plane indicated by the section line 10—10 of Figure 1.

In trolley frogs of the character disclosed in my above identified prior patent, provision is made for electrically connecting a single trolley wire with a pair of angularly disposed trolley wires to form an electrical connection therebetween, and to permit the passage of a trolley roller from either of the pair of inclined trolley wires to a single wire without necessitating the removal of the trolley wire from the over-head trolley wire. In said prior patent there was made provision for bearing the angular position of the pair of trolley wires with respect to each other, for the purpose of enabling the frog to be used with electric railways of the over-head trolley wire type at places where switching of the trolley from one over-head trolley wire to another in accordance with transfer of the electrical equipment from one railway track to a branch track is to be effected.

In trolley frogs of the character above mentioned, a difficulty in operation arises by virtue of the fact that the single trolley wire is not directly aligned with either of the two angularly disposed wires, but is usually positioned substantially midway therebetween. In the present invention however, the advantages of an angular adjustment of the angularly disposed trolley wires is possible while at the same time the single trolley wire may be selectively aligned with either of the pair of trolley wires. This enables the device to be conveniently employed upon switching portions of electric railway tracks and their over-head trolley wires, and enables a single standard construction of trolley frog to be utilized with trolley wire sections of various angular relations with respect to each other.

Referring now more specifically to the accompanying drawings, wherein like numerals designate similar parts throughout the various views, it will be seen that the improved trolley frog in accordance with this invention consists of a body 10 which may conveniently comprise a flat plate like electrically conducting member of an elongated shape and which has a relatively narrow central portion together with outwardly curving end portions. What may be termed the top face or surface of the body 10 is preferably substantially flat and upon its two sides is provided with a pair of depending flanges constituting guide rails, as shown at 12. At one end, the body 10 is adapted to be electrically connected with a pair of angularly disposed trolley wires, while at the other end the body is provided with a plate 14 pivoted thereto, which plate is electrically connected with the body and with a single trolley wire adapted to be selectively aligned with each of the pair of trolley wires previously mentioned.

The body 10, at the end to which the pair of angularly related trolley wires are attached, is provided with a pair of laterally extending flanges or bosses 16 and 18 which are apertured as at 20 to provide means whereby the trolley frog may be supported. Upon that side of the end of the frog having the boss 18, the body is longitudinally extended to provide an extension 22 which likewise has a pair of laterally disposed bosses 24 and 26, each of which is apertured as at 28 to assist in supporting the frog. Secured to the underside of the body 10, adjacent but on the opposite side of the body from the extension 22, is a bracket 30 likewise having a pair of bosses 32 and 34 each of which is apertured as at 36.

The bracket 30 is disposed at an angle with respect to the extension 22, and is pivoted to the body 10 as by a bolt 38.

As shown in Figure 10, the portions 22 and 30 have lateral plate-like extensions which are slidingly received upon each other, and one of these plate-like extensions, such as that of the portion 30, is provided with an arcuate transversely disposed slot 40 in which is slidably received the fastening bolt 42 carried by the plate-like extension of the portion 22. By this means, the members 30 and 22 may be adjusted at varying angular relations with respect to each other whereby a pair of trolley wires secured to these portions as set forth hereinafter, may have their angular relations with respect to each other varied as desired.

Upon its upper surface, each of the portions 30 and 22 is provided with a longitudinally extending groove or channel 44 and 46 respectively, and each of these grooves is adapted to receive the end of a trolley wire which is clamped therein in a manner which will be subsequently apparent. The channels 44 and 46 are preferably formed by providing a semi-cylindrical depression in the material of the portions 30 and 24, as shown in Figure 10, to best provide a depressed longitudinally extending rib 48 and 50 for each of the channels 44 and 46. The arrangement is such that a trolley wheel riding along the trolley wire disposed longitudinally of the channels 44 or 46, will engage the semi-cylindrical depending longitudinally extending rib members 48 or 50, until the roller passes from the adjacent ends of these ribs as will be apparent from Figure 3, and then passes across the under surface of the trolley frog.

The other end of the body 10 terminates an arcuately extending vertical surface 52, and the flanges or rails 12 extend beyond this surface and have horizontally disposed inturned flanges 54 and 56 having horizontal support and bearing surfaces 58 and 60 which are disposed below the top surface of the body 10, as will be apparent from Figure 6.

Adjacent the arcuate surface 52, the body 10 is provided with a pair of spaced apertures 62 and 64 and intermediate its ends there is provided upon the body 10 a further aperture 66.

Referring now particularly to Figure 5, it will be seen that the plate 14 includes a main body portion 68 having a flat horizontally disposed upper surface having pairs of oppositely and laterally extending lugs 70, 72, 74 and 76 each of which is provided with an aperture 78 by means of which a suitable supporting means may be provided for receiving trolley wire clamping means as set forth hereinafter.

Upon its under surface, the plate 14 is provided with a longitudinally extending rib 80 which serves the same functions as the previously mentioned ribs 48 and 50 at the other end of the trolley frog. As it will now be apparent from the Figures 4, 5 and 7, the plate 14 has the depending rib formed by a depressed channel or groove 82.

At its inner end, the plate 14 is provided with an axially extending tongue or finger 84 whose under surface constitutes a continuation of the rib 80, and which has an internally screw-threaded aperture 86 adapted to underlie the body 10, and a fastening bolt or pivot pin 88, see Figure 4, is adapted to extend through the apertures 66 of the body 10 and engage in the internally threaded bore 86 of the tongue 84, whereby the plate 14 will be pivotally secured to the body.

In the pivotally secured position, the top surface of the tongue 84 will be slidingly engaged upon the under surface of the body 10 as will be readily apparent from Figure 4, and the plate 14 has a pair of arcuate flanges 90 and 92 adapted to extend above and be slidably received upon the top surface of the body 10. These flanges each have a pair of circumferentially spaced apertures 94 and fastening bolts 96, see Figures 1 and 8, extend through these flanges 90 and 92, through the apertures 94 thereof, and are engaged in the screw-threaded apertures 62 and 64. The apertures 94 are so spaced relative to each other that the plate 14 may be secured to the body 10 in either of the two angularly adjusted positions shown in full lines and in dotted lines in Figure 1. It is of course to be understood that any desired number of apertures may be so provided in order to attain any desired number of angular positions of the plate 14 with respect to the body.

However, the intention is that these apertures shall be so spaced as to enable the rib 80 on the plate to be selectively aligned with either of the angularly related ribs 48 and 50 at the other end of the body.

As will be readily apparent from Figures 4, 5 and 8, with bolts 96 removed, the arcuate surface 52 of the body 10 is slidingly and abuttingly engaged by corresponding arcuate surfaces 98 upon the plate which arcuate surfaces 98 connect the flanges 90 and 92 with the body portion 70 of the plate.

As it will now be apparent, during the pivoting action of the plate 14 upon the body 10 as the former is adjusted relative to the latter, the overlying flanges 90 and 92 will serve to assist in positioning and in guiding the plate in its sliding movement upon the body, and the engagement of the surfaces 98 and 52 will contribute towards this purpose. Further, the under surface of the body portion 70 and immediately adjacent the flanges 90 and 92 will rest upon the supporting brackets or flanges 58 and 60. Thus, the plate is centered upon both the upper and lower surfaces of the body 10 while being pivotally secured thereto.

It should be noted, as shown in Figure 3, that the adjacent ends of the angularly disposed ribs 48 and 50 terminate in close proximity but spaced relation to each other, and also are spaced from the adjacent end of the rib 80 of the plate. As above mentioned, it is intended that a trolley wheel moving along the trolley wire shall proceed from either the ribs 48 and 50, across the bottom of the body 10 between the guide rails 12 thereon, and upon the adjacent end of the rib 80, or in the reverse direction if desired. To facilitate this passage of the trolley wheel, there is provided a pair of laterally spaced depending guide ribs 100 and 102 upon the bottom surface of the body 10 between the rails 12, these guide rails having curved surfaces 104. The position of the ribs 100 and 102 and their curved surfaces 104 is such that for any position of adjustment of the plate 14 or of the bracket 30, the rib 80, will align with either of the ribs 48 and 50, will pass within the guide ribs 100 and 102. Thus, the trolley wheel will be maintained in approximately a straight line of travel between the oppositely disposed ribs.

It is contemplated that the adjacent ends of trolley wires, one of which is shown at 106, will be clamped in the channels 44, 46 and 82 by any suitable fastening means such as the fastening clamps shown in Figures 7 and 9. These clamps, each of which is indicated generally by the numeral 108, consist of T-shaped members having a depending stem portion 110 which is preferably serrated as at 112 upon its lower surface for frictionally gripping the trolley wire 106 and holding the same in the corresponding channel. The clamping means further includes oppositely, laterally extending wings 114 and 116, each of which is apertured as at 118 for the reception of fastening bolts 120 which engage in the clamping apertures 78 of the plate 14, or in the apertures 28 and 36 of the portions 24 and 30.

From the foregoing, it will be readily apparent that there has been provided a trolley frog by means of which the pair of angularly disposed trolley wires may be clamped in various angularly adjusted positions with respect to each other, or a single trolley wire may be clamped to an adjustable plate which is pivotally mounted upon the frog and may be selectively aligned with either of the angularly related trolley wires.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

A trolley frog for trolley wires comprising an elongated body, means for securing the adjacent ends of a pair of angularly disposed branch trolley wires to said body at one end, means for securing the end of a trolley wire to the other end of said body in spaced relation to said adjacent ends, said last means including a plate pivoted to said body and adjustable to aline said end selectively with either of said adjacent ends, said plate having a centrally disposed tongue extending from one end thereof and underlying said body, a pivot connecting said tongue to said body, said plate and body having slidably engaging cooperating guide and support surfaces, means for limiting pivotal movement of said plate upon said body, said plate having longitudinally extending flanges, said body having laterally extending brackets, said cooperating guide and support surfaces being disposed on said longitudinally extending flanges and on said laterally extending brackets.

References Cited in the file of this patent
UNITED STATES PATENTS

| | | |
|---|---|---|
| 536,250 | Wood | Mar. 26, 1895 |
| 1,445,855 | Slaymaker | Feb. 20, 1923 |
| 1,803,061 | George | Apr. 28, 1931 |
| 2,099,494 | Matthes | Nov. 16, 1937 |
| 2,225,766 | Broom et al. | Dec. 24, 1940 |